Aug. 14, 1934.        J. J. JANCA        1,969,981

SINGLE PHASE INDUCTION MOTOR

Filed April 18, 1931

Inventor
Joseph J. Janca
by Rippey + Kingsland
His Attorneys.

Patented Aug. 14, 1934

1,969,981

UNITED STATES PATENT OFFICE 1,969,981

SINGLE PHASE INDUCTION MOTOR

Joseph J. Janca, St. Louis, Mo., assignor to The Emerson Electric Mfg. Co., St. Louis, Mo., a corporation of Missouri Application April 18, 1931, Serial No. 531,028

1 Claim. (Cl. 172—278)

This invention relates to single phase induction motors and the provision of means whereby the motor may be caused to rotate selectively in either direction.

An object of the invention is to provide means whereby the direction of rotation of a single phase induction motor may be selectively controlled by short circuiting either of two sets of auxiliary windings displaced from the main windings on the primary.

Further objects will be apparent from the following detail description taken in connection with the accompanying drawing, in which—

A stator iron 1 has a series of polar projections 2. The illustrations show merely a conventional or diagrammatic shape of polar projections. In practice the polar projections may be any shape or spacing consistent with good design.

Figure 1:
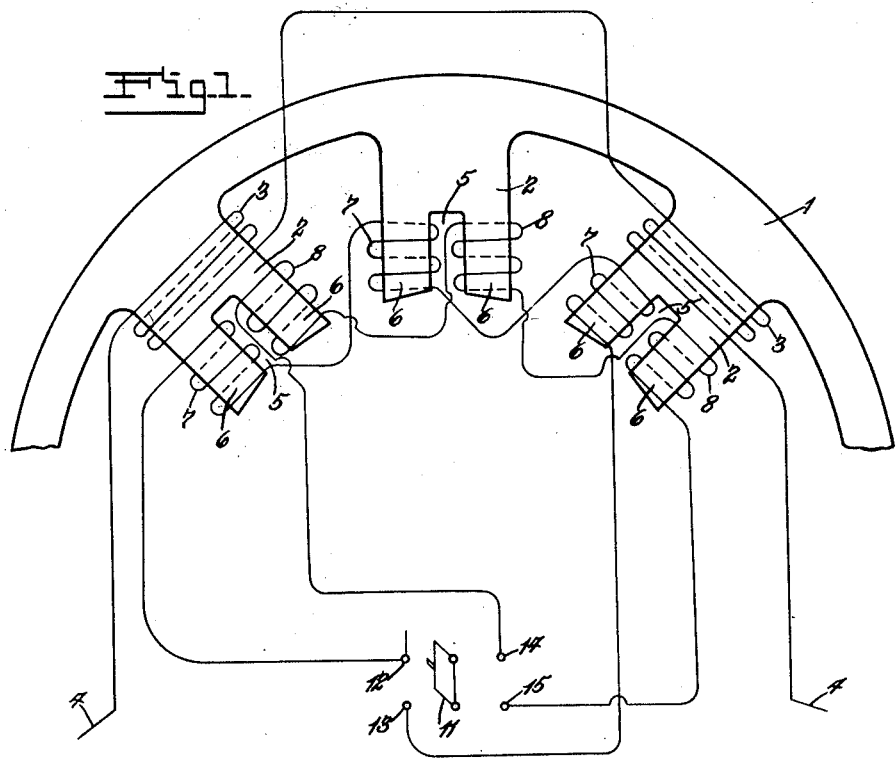
Fig. 1 is a diagram of one embodiment of the invention.

In the embodiment shown in Fig. 1 each alternate polar projection 2 has a main winding 3, such main winding being connected in series and adapted to be connected by leads 4 to a source of current supply. In such an arrangement consequent poles are produced on the unwound polar projections with a polarity opposite from that of the wound poles.

In the embodiment illustrated in Fig. 1 each of the polar projections has a central slot 5 forming on the projections oppositely disposed portions 6, about which are wound auxiliary windings 7 and 8, respectively. The windings 7 are connected in series and the windings 8 are connected in series. The coils on the consequent poles are oppositely wound from the corresponding coils on the main poles.

Figure 2:
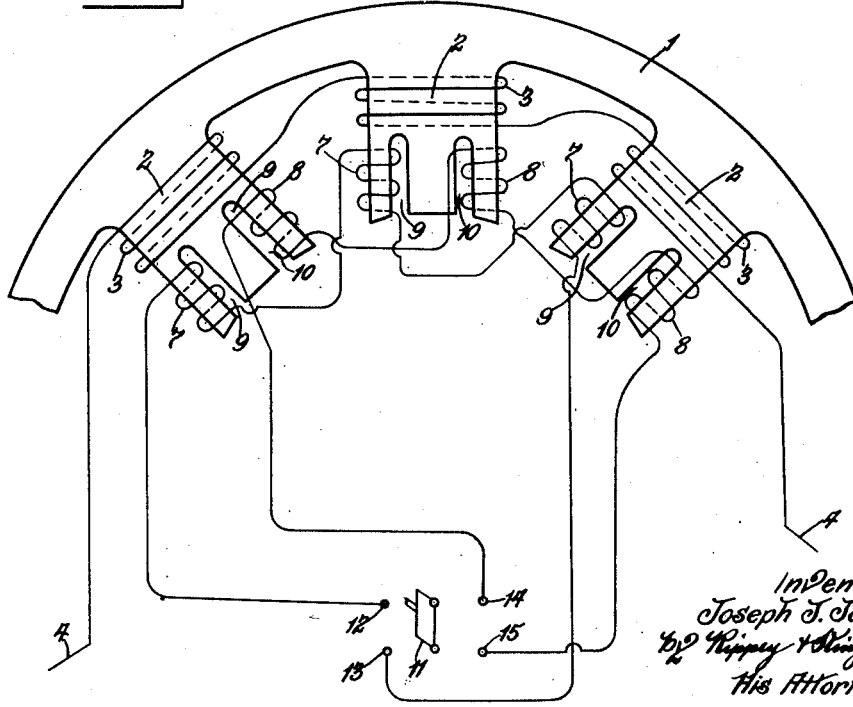
Fig. 2 is a diagram of another embodiment.

In the embodiment shown in Fig. 2 the coils 3 of the main windings are wound over each polar projection and the auxiliary or starting windings 7 and 8 are wound over approximately twenty-five percent of the total polar projections and require two slots, 9 and 10, in each polar projection. In practice the amount of the total polar projection embraced by each auxiliary winding may vary from ten percent to seventy-five percent.

A switch 11 is provided which may selectively connect terminals 12 and 13, thus short circuiting the windings 7, or connect terminals 14 and 15, thus short circuiting the windings 8. The switch 11 is shown as independent of the main windings, its only function being to selectively short circuit either of the starting windings and in this arrangement a separate switch is required for opening and closing the main circuit. In practice, however, it will be obvious that the reversing switch 11 may be combined with the main control switch in order to simplify the control of the motor.

The theory of operation is as follows: The alternating current enters the main windings 3 through the leads 4 and produces an alternating flux in the polar projections 2. This alternating flux induces a voltage in the auxiliary windings 7 and 8. If the windings 7 are now short circuited by the switch 11 an alternating current will flow in the windings 7. This current results in a lag or time displacement of the alternating flux in that part of the poles 2 embraced by the windings 7, with respect to the remainder of the pole and a consequent rotation of the rotor in a counter-clockwise direction or in the direction of the auxiliary winding 7. Similarly, if the ends 12 and 13 of the windings 7 are opened and the ends 14 and 15 of the windings 8 are closed, the current will flow in the windings 8 resulting in a time flux displacement in that part of the polar projections 2 embraced within the windings 8 and a consequent clockwise rotation of the rotor or a rotation in the direction of the auxiliary windings 8. It will be understood, of course, that a relatively small number of turns of comparatively large wire comprises the auxiliary windings.

By varying the number of turns on the starting winding and the amount of the total pole embraced by the starting winding the operation and characteristics of the motor may be controlled to the extent of making it reversible from full speed or requiring the rotor to be brought to rest before reversing the rotation.

It is obvious that parts of the invention may be used without the whole, and that various changes may be made in the details of construction within the scope of the appended claim, without departing from the spirit of this invention.

I claim:

A single phase induction motor having a plurality of polar projections on the primary, a main winding similarly wound about each alternate projection to produce the same polarity, an auxiliary winding about a portion of each polar projection, each alternate auxiliary winding being oppositely wound, said auxiliary windings being positioned and adapted when short circuited to cause rotation of the secondary in a clockwise direction, a set of auxiliary windings similar to the first mentioned auxiliary windings but oppositely positioned to cause when short circuited rotation of the secondary in a counter-clockwise direction, and means for selectively short circuiting either of said sets of auxiliary windings.

JOSEPH J. JANCA.